United States Patent [19]

Howlett

[11] Patent Number: 5,047,992
[45] Date of Patent: Sep. 10, 1991

[54] ELECTROMAGNETICALLY INDUCED ACOUSTIC WELL LOGGING

[75] Inventor: Donald L. Howlett, Kingwood, Tex.

[73] Assignee: Texaco Inc., White Plains, N.Y.

[21] Appl. No.: 546,605

[22] Filed: Jun. 29, 1990

[51] Int. Cl.$^5$ .......................... G01V 1/40; G01V 1/143
[52] U.S. Cl. ..................................... 367/31; 367/912; 181/106; 73/578; 73/668
[58] Field of Search ............... 367/31 X, 82, 168, 912; 381/192; 181/106, 113; 73/578 X, 668 X

[56] References Cited

U.S. PATENT DOCUMENTS

| | | | |
|---|---|---|---|
| 3,354,983 | 11/1967 | Erickson et al. | 367/912 |
| 3,790,930 | 2/1974 | Lamel et al. | 367/31 |
| 4,207,961 | 6/1980 | Kitsunezaki | 181/106 |
| 4,383,591 | 5/1983 | Ogura | 181/106 |
| 4,700,803 | 10/1987 | Mallet et al. | 367/31 |
| 4,751,688 | 6/1988 | Paulsson | 181/106 |

Primary Examiner—Nelson Moskowitz
Attorney, Agent, or Firm—Jack H. Park; Kenneth R. Priem; Robert A. Kulason

[57] ABSTRACT

An electromagnetic source or sources in a sonde in a well bore is caused to emit electromagnetic forces into the well casing. The electromagnetic forces cause displacement of the casing, inducing acoustic waves. The acoustic waves may be either P-waves or S-waves, depending on the type of electromagnetic source used. The response of earth formations to the acoustic waves, once detected, is used to detect fractures in the formations.

25 Claims, 3 Drawing Sheets

ELECTROMAGNETICALLY INDUCED ACOUSTIC WELL LOGGING

BACKGROUND OF INVENTION

1. FIELD OF INVENTION: The present invention relates to acoustic well logging.

2. DESCRIPTION OF PRIOR ART: In acoustic well logging, acoustic waves are emitted from a wave transmitter or source in a well borehole into subsurface formations to obtain information about the formations. This is done by detecting the acoustic waves after their travel through the formations to a receiver/transducer spaced from the source. The manner in which the transmitted waves are modified during travel through the formation gives indications of the nature of the formation. One area of interest is detection of fractures in the formations. However, polarized acoustic shear waves or S-waves were necessary for this purpose.

It has been known to use piezoelectric crystals or magnetostrictive materials to form pressure waves in borehole fluid to form acoustic signals. A portion of the pressure wave energy was then coupled into the earth formations surrounding the borehole. Such a technique was often effective in an open or uncased borehole. However, in a cased borehole almost all of the signal energy remained trapped in the casing.

SUMMARY OF INVENTION

Briefly, the present invention provides a new and improved method of acoustic well logging. It is particularly adapted for investigating subsurface formations adjacent a cased well borehole. Electromagnetic energy is emitted from an electromagnetic source in the cased well borehole. The emitted electromagnetic energy displaces the well borehole casing, forming acoustic waves which travel through the subsurface formations. The acoustic waves are then sensed after their travel through the subsurface formations at a transducer spaced from the electromagnetic source.

The electromagnetic source may take several forms. For example, it may be an electromagnet having its magnetic poles spaced from each other along a longitudinal axis transverse the well borehole axis. Such a source displaces the generally circular cross-section well borehole casing into an elliptical cross-section, causing the casing to contract. When the electromagnetic is periodically activated by electrical current, pressure waves or P-waves, which travel along an axis parallel to the longitudinal axis of the electromagnet are formed.

Alternatively, the electromagnetic source may be one or more sets of electromagnets aligned along the longitudinal axis of the well borehole. When one set of aligned electromagnets is used, the uppermost pole of the upper electromagnet and the lowermost pole of the lower electromagnet face opposite sides of the borehole casing. When two sets are used, corresponding poles of the second set face portions of the borehole casing at right angles to the portion of the borehole casing faced by those of the first set. When the set, or sets, of electromagnets is periodically activated by electric current, a bending moment is exerted on the borehole casing, forming shear waves or S-waves which travel vertically in the formation parallel to the well borehole axis.

DESCRIPTION OF PREFERRED EMBODIMENT

Figure 2:
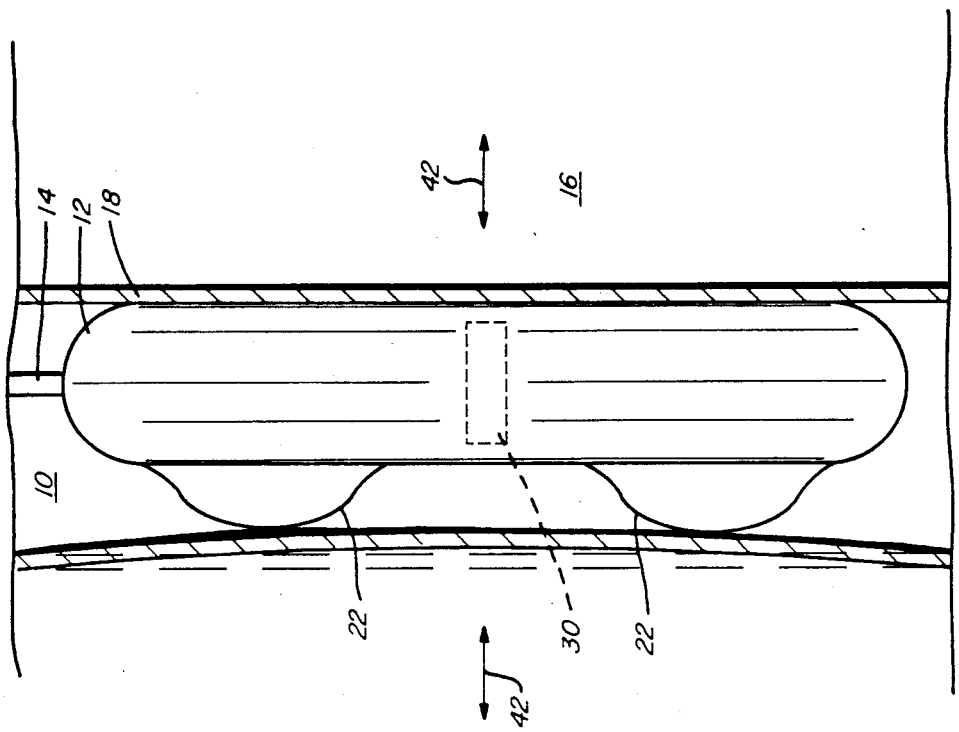
FIG. 2 is an elevation view, taken partly in cross-section, of a portion of the tool of FIG. 1.
Figure 1:
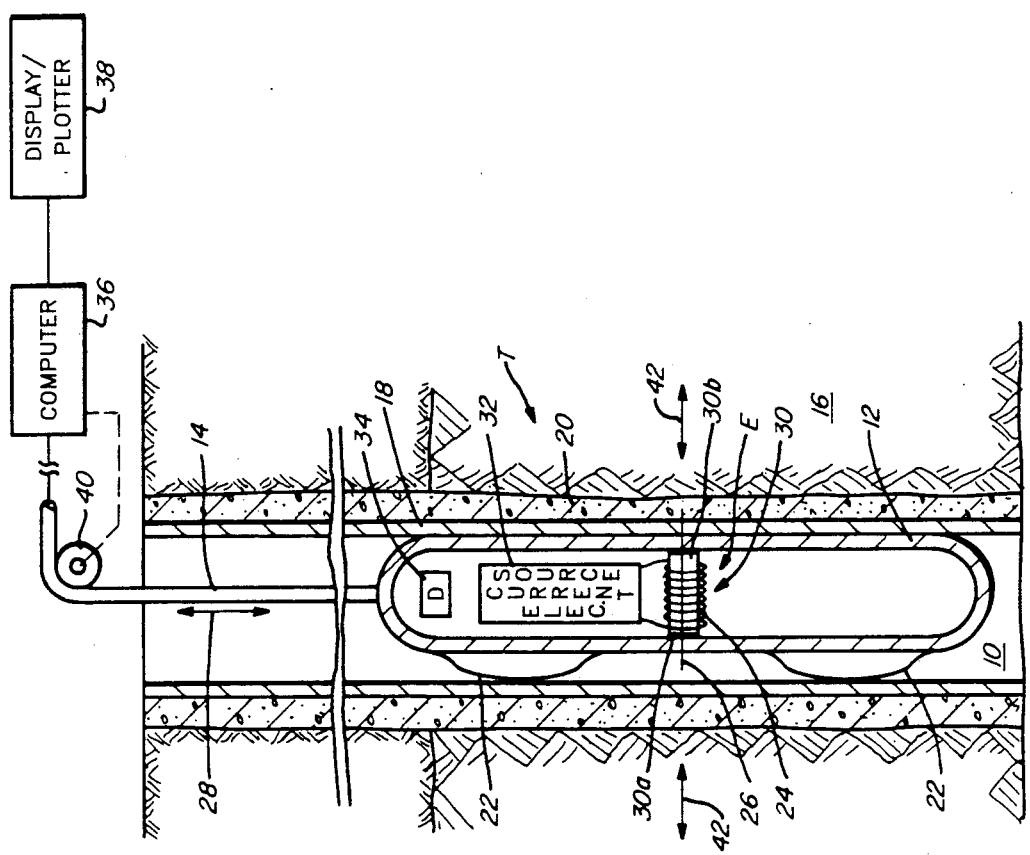
FIG. 1 is an elevation view, taken partly in cross-section, of an electromagnetically induced acoustic well logging tool according to the present invention in a well borehole.

In the drawings, the letter T (FIG. 1) designates generally an electromagnetically induced acoustic well logging tool in a wellbore 10. The well logging tool T includes an electromagnetic source E mounted in a sonde 12 which is supported by an armored well logging cable or wireline 14 in the well borehole 10.

The tool T is moved in the well borehole 10 to a depth of interest adjacent a subsurface earth formation 16. The well borehole 10 is lined with a steel casing 18 at the depths of interest and a lining of cement 20 has been introduced into an annular space between the casing 18 and the subsurface earth formation 16. The sonde 12 is stabilized at depths of interest by a suitable number of conventional stabilizer springs 22.

The electromagnetic source E includes a cylindrically wound inductor or coil 24 having a longitudinal axis 26 displaced perpendicular to a longitudinal axis 28 of the well borehole 10. A ferromagnetic core 30 is mounted within the coil 24 along its longitudinal axis 26, having opposite magnetic poles at end portions 30a and 30b.

The coil 24 receives operating electrical power from an electrical current source 32 driven by electrical power and control signals provided by the well logging cable 14 from the surface. The electrical current source 32 may be a pulsed source, providing high energy, short duration pulses of suitable length. A typical time duration, for example, would be on the order of from about one hundred to five hundred microseconds. Alternatively, the electrical current source may be a swept frequency source which periodically activates the source E with swept frequency signals, typically sinusoids. A suitable swept frequency range would be, for example, about one thousand hertz to about five thousand hertz.

An acoustic wave detector/transducer 34 is mounted in the sonde 12 at a spaced position from, either above or below, the source E. The detector/transducer 34 forms electrical signals in response to acoustic waves or vibrations sensed. The electrical signals from the transducer 34 are transmitted via the wireline 14 to a computer 36 and a data display or plotter 38 at the surface for recording and analysis. Typically, signals formed in the transducer 34 are digitized and amplified before transmission over the well logging cable 14.

As is conventional, a sheave wheel 40 is mounted at the surface to form a record of the depth of sonde 12 in the well borehole 10 while recordings are being made of the electrical signals formed by the transducer 34. The record of depth formed by the sheave wheel 40 is also furnished to the computer 36 for recording and processing.

In the operation of the well logging tool T, the coil 24 is periodically activated by the current source 32, causing the coil 24 to generate electromagnetic lines of force along the longitudinal axis 26 which are enhanced by the ferromagnetic core 30. The electromagnetic lines of force from the source E act through the sonde 10 on the steel casing 18, causing it to repeatedly expand and contract slightly from its generally circular vertical cross-section into a slightly elliptical cross-section. This causes contraction and expansion of the casing 18 during the periodic activation of the coil 24 by the source 32, causing acoustic pressure waves or P-waves which travel along axes 42 parallel to the longitudinal axis 26 of the electromagnetic source E.

The response of the subsurface formation 16 to the pressure waves or P-waves is then sensed by the detector/transducer 34. The responses of the transducer 34 are transferred via the wireline 14 to the computer 36 for processing and analysis.

An alternate electromagnetically induced well logging tool T-1 (FIG. 3) has an electromagnetic source E-1 having an uppermost electromagnetic coil 50 and a lowermost electromagnetic coil 52 mounted in a sonde 12 in the well borehole 10. Other like structure of the tool T-1 to that of the tool T performing like functions bears like reference numerals. The coils 50 and 52 have ferromagnetic cores 54 and 56, respectively, disposed along a longitudinal axis 58 corresponding to the longitudinal axis 28 of the well borehole 10.

The uppermost ferromagnetic core 54 has opposed magnetic poles at upper and lower ends 54a and 54b, respectively. The lowermost ferromagnetic core has opposed magnetic poles at its upper and lower ends 56a and 56b, respectively. The uppermost magnetic pole 56a of the core 56 and the lowermost magnetic pole 54b of the uppermost core 54 are of like magnetic polarity, as are the uppermost magnetic pole 54a of the core 54 and the lowermost magnetic pole 56b of the core 56. Accordingly, when coils 50 and 52 are periodically activated by the source 32, electromagnetic lines of force are exerted on casing 18 as indicated by arrows 60, introducing a bending moment into the casing 18. The bending moment on the casing 18 causes formation of acoustic shear waves or S-waves which travel in the formation 16 along lines indicated by arrows 62 parallel to the longitudinal axis 28 of the well borehole 10. The acoustic shear or S-waves once detected in transducer/detector 34 can be analyzed after processing in the computer 36 for information indicative of conditions in the earth, such as possible fractures in the formation 16.

Figure 3:
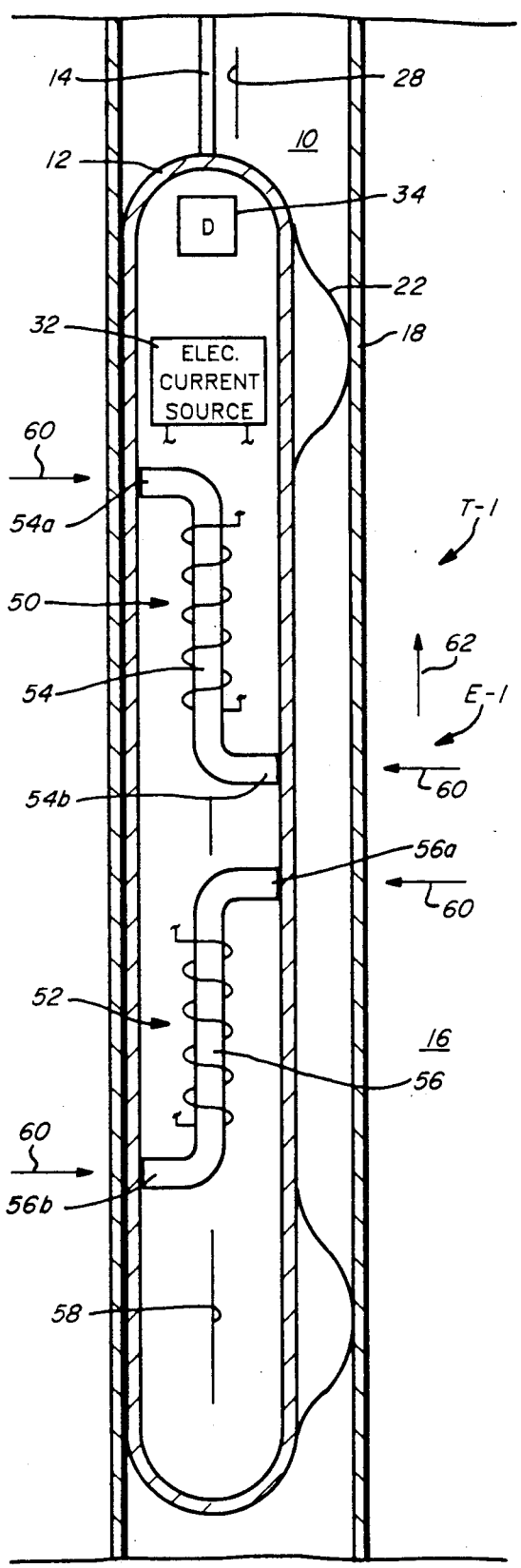
FIG. 3 is an elevation view, taken partly in cross-section, of another electromagnetically induced acoustic well logging tool according to the present invention.
Figure 4:
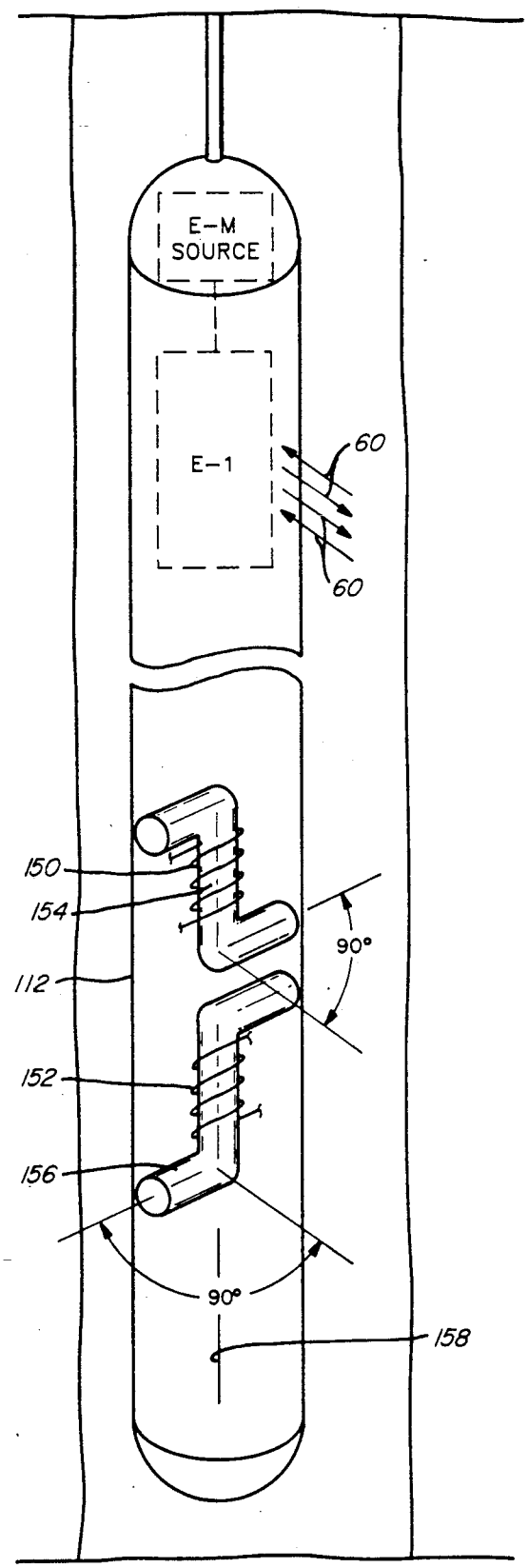
FIG. 4 is an isometric view of an addition to the well logging tool of FIG. 3.

In another alternate electromagnetically induced well logging tool T-2 (FIG. 4), a sonde 112 has been elongated in order to accommodate another pair of electromagnetic coils, comprising an uppermost coil 150 and a lowermost coil 152 mounted beneath a coil set of like construction and function to that of the electromagnetic source E-1 of FIG. 3. The structure of the source E-1 is shown only as a block diagram in FIG. 4, since elements are shown in FIG. 3. The coils 50 and 52 of the first coil set comprising the electromagnetic source E-1 cause lines of force to be exerted on the casing 18 as indicated by the arrows 60 (FIGS. 3 and 4). It can be seen that the arrows 60 align in a common vertical plane parallel to the longitudinal axis 28 of the well borehole 10.

A second electromagnetic source E-2 has an uppermost coil 150 and a lowermost coil 152 mounted in the sonde 112 below the electromagnetic source E-1. The coils 150 and 152 have ferromagnetic core 154 and 156, respectively, disposed along a longitudinal axis 158 of the electromagnetic source E-1 corresponding to the longitudinal axis 28 of the well borehole 10. However, the uppermost ferromagnetic core 154 and lowermost core 156 of the source E-2 have their magnetic poles disposed at a 90° angle (as indicated in FIG. 4) from the poles of the electromagnetic source E-1 in a horizontal plane transverse the longitudinal axis 28 of the well borehole 10.

Accordingly, when the coils 150 and 152 are periodically activated by the source 32, electromagnetic lines of force are exerted on the casing 18 at perpendicular locations in the horizontal plane from the lines of force 60 (FIG. 4), again introducing vertically travelling shear waves which are, however, oriented in a perpendicular direction in the horizontal plane from the shear waves formed by the electromagnetic source E-1. The second set of vertically travelling shear waves formed by the source E-2 are particularly adapted for use in detecting shear wave anisotropy as an aid in identifying formation fractures.

Figure 5:
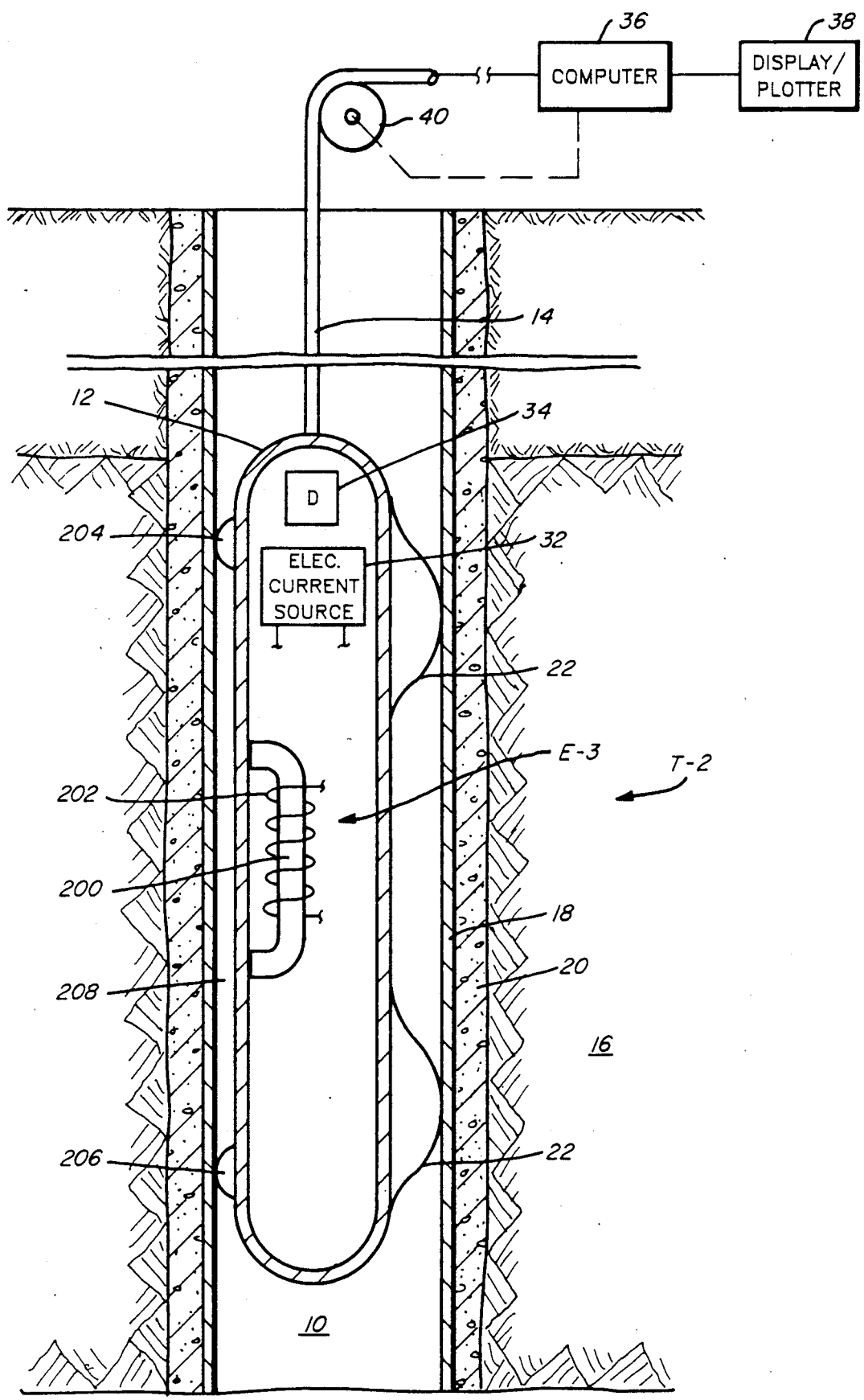
FIG. 5 is an elevation view, taken partly in cross-section of another electromagnetically induced acoustic well logging tool according to the present invention.

Another alternative electromagnetically induced acoustic well logging tool T-2 (FIG. 5) according to the present invention has an electromagnetic source E-3 mounted in the sonde 12. Other like structure to that of the embodiments set forth above bears like reference numerals. The source E-3 has a ferromagnetic core 200 about which is wound an electromagnetic coil 202. The electromagnetic coil 202 is activated in a like manner to the coil 24 to cause the casing 18 to expand and contract, so that the transducer 34 may form electrical signals in response to the acoustic waves or vibrations sensed. As has been set forth, the electrical signals are transmitted via wireline 14 to computer 36 and data display or plotter 38 for processing and analysis.

The sonde 12 is again pushed toward the casing 18 by a suitable number of conventional stabilizer springs 22. The sonde 12 does not contact the casing 18 along any appreciable portion of its length. Rather, an upper node or contact 204 and a lower node or contact 206, between which is located the electromagnetic source E-3, serve as the points of contact between the sonde 12 and the casing 18. Otherwise, a small clearance indicated by reference numeral 208 exists between the casing wall 18 and the sonde 12.

Having described the invention above, various modifications of the techniques, procedures, material and equipment will be apparent to those in the art. It is intended that all such variations within the scope and spirit of the appended claims be embraced thereby.

What is claimed is:

1. A method of acoustic well logging to investigate subsurface formations adjacent a cased well borehole, comprising the steps of:
   emitting electromagnetic energy from an electromagnetic source in the cased well borehole;
   displacing the well borehole casing with the emitted electromagnetic energy to form acoustic waves which travel through the subsurface formations; and
   sensing the acoustic waves after their travel through the subsurface formations at a transducer spaced from the electromagnetic source.

2. The method of claim 1, wherein said step of emitting comprises the step of:
   activating an electromagnet having its poles spaced from each other along a longitudinal axis transverse a longitudinal axis of the well borehole.

3. The method of claim 1, wherein said step of emitting comprises the step of:
   activating an electromagnet having its poles spaced from each other along a longitudinal axis substantially perpendicular to a longitudinal axis of the well borehole.

4. The method of claim 1, wherein the well borehole casing is substantially circular in cross-section.

5. The method of claim 4, wherein said step of displacing the well borehole casing comprises the step of:
   causing the well borehole casing to contract to an elliptical cross-section.

6. The method of claim 1, wherein said step of displacing the well borehole comprises the step of:
   causing the well borehole casing to contract.

7. The method of claim 1, wherein said step of emitting comprises the step of:
   periodically activating an electromagnetic coil with an electric current.

8. The method of claim 7, wherein said step of emitting comprises the step of:
   periodically activating an electromagnetic coil with an electric current of high energy, short duration pulses.

9. The method of claim 7, wherein said step of emitting comprises the step of:
   periodically activating an electromagnetic coil with an electric current of high energy, short duration pulses lasting from about one hundred to about five hundred microseconds.

10. The method of claim 7, wherein said step of emitting comprises the step of:
    periodically activating an electromagnetic coil with a swept frequency sinusoidal signal.

11. The method of claim 7, wherein said step of emitting comprises the step of:
    periodically activating an electromagnetic coil with a swept frequency sinusoidal signal in the range of from about 1,000 hertz to about 5,000 hertz.

12. The method of claim 1, wherein:
   (a) said step of emitting comprises the step of activating an electromagnet having its poles spaced from each other along a longitudinal axis transverse a longitudinal axis of the well borehole; and
   (b) said step of displacing comprises the step of displacing the borehole casing to form pressure waves which travel along an axis parallel to the longitudinal axis of the electromagnet poles.

13. The method of claim 1, wherein said step of emitting comprises the step of:
    activating plural electromagnets aligned along a longitudinal axis of the well borehole.

14. The method of claim 13, wherein said step of emitting comprises the step of:
    activating plural electromagnets aligned along a longitudinal axis of the well borehole with their poles facing opposite sides of the borehole casing.

15. The method of claim 13, wherein said step of emitting comprises the step of:
    simultaneously activating plural electromagnets aligned along a longitudinal axis of the well borehole.

16. The method of claim 13, wherein said step of emitting comprises the step of:
   (a) activating a first set of electromagnets aligned along a longitudinal axis of the well borehole with the uppermost pole of the upper electromagnet and the lowermost pole of the lower electromagnet facing opposite sides of the casing; and
   (b) activating a second set of electromagnets aligned along the longitudinal axis of the well borehole with the uppermost pole of the upper electromagnet and the lowermost pole of the lower electromagnet facing portions of the casing at right angles to the sides of the casing faced by the poles of the first set of electromagnets.

17. The method of claim 13, wherein said step of displacing the well borehole casing comprises the step of:
    exerting a bending moment on the well borehole casing.

18. The method of claim 1, wherein:
   (a) said step of emitting comprises the step of activating plural electromagnets aligned along a longitudinal axis of the well borehole; and
   (b) said step of displacing comprises the step of displacing the borehole casing to form shear waves which travel vertically in the formation parallel to a longitudinal axis of the well borehole.

19. An apparatus for acoustic well logging to investigate subsurface formations adjacent a cased well borehole, comprising:
   a sonde adapted to be lowered by a wireline in the cased well borehole to a depth adjacent a formation of interest;
   an electromagnetic source mounted in said sonde, said electromagnetic source comprising a plurality of electromagnetic coils, each having ferromagnetic means disposed with its magnetic poles spaced from each other along an axis parallel to the well borehole axis;
   said plurality of electromagnetic coils comprising a coil set comprising a first and a second electromagnetic coil having magnetic poles of one polarity adjacent each other in said sonde and magnetic poles of opposite polarity spaced in said sonde from said magnetic poles adjacent each other and facing opposite sides of the borehole casing; and
   means for periodically activating said electromagnetic source to displace the well borehole casing to form acoustic waves which travel through the subsurface formations.

20. The apparatus of claim 19, further including:
    sensor means in said sonde for sensing the acoustic waves after their travel through the subsurface formations.

21. The apparatus of claim 25, wherein said means for periodically activating comprises:
    a source of electrical current activating said electromagnetic source to displace the well borehole casing to form pressure waves which travel along an axis parallel to the longitudinal axis of said magnetic poles of said ferromagnetic means.

22. An apparatus for acoustic well logging to investigate subsurface formations adjacent a cased well borehole, comprising:
    a sonde adapted to be lowered by a wireline in the cased well borehole to a depth adjacent a formation of interest;
    an electromagnetic source mounted in said sonde;

means for periodically activating said electromagnetic source to displace the well borehole casing to form acoustic waves which travel through the subsurface formations; and node means mounted on said sonde for contacting a wall of the cased well borehole.

23. The apparatus of claim 22, wherein said node means comprises:

a plurality of nodes extending outwardly from said sonde and having at least one node above and one node below said electromagnetic source in said sonde.

24. An apparatus for acoustic well logging to investigate subsurface formations adjacent a cased well borehole, comprising:

a sonde adapted to be lowered by a wireline in the cased well borehole to a depth adjacent a formation of interest;

an electromagnetic source mounted in said sonde, said electromagnetic source comprising a plurality of electromagnetic coils, each having ferromagnetic means disposed with its magnetic poles spaced from each other along an axis parallel to the well borehole axis;

said plurality of electromagnetic coils comprising:

a first set of a plurality of electromagnetic coils, each having ferromagnetic means disposed with its magnetic poles spaced from each other along an axis parallel to the well borehole axis and facing opposite sides of the borehole casing;

a second set of a plurality of electromagnetic coils, each having ferromagnetic means disposed with its magnetic poles spaced from each other along an axis parallel to the well borehole axis and facing opposite sides of the borehole casing at right angles from said magnetic poles of said first set; and means for periodically activating said electromagnetic source to displace the well borehole casing to form acoustic waves which travel through the subsurface formations.

25. An apparatus for acoustic well logging to investigate subsurface formations adjacent a cased well borehole, comprising:

a sonde adapted to be lowered by a wireline in the cased well borehole to a depth adjacent a formation of interest;

an electromagnetic source mounted in said sonde, said electromagnetic source comprising an electromagnetic coil having ferromagnetic means disposed with its magnetic poles spaced from each other along a longitudinal axis transverse the well borehole axis;

means comprising a source of electrical current for periodically activating said electromagnetic source to displace the well borehole casing to form shear waves which travel through the subsurface formations along an axis parallel to the well borehole axis.

* * * * *